United States Patent [19]

Perritt

[11] Patent Number: 5,354,462

[45] Date of Patent: Oct. 11, 1994

[54] MAGNETIC FILTER STRAP

[75] Inventor: Richard G. Perritt, Kelowna, B.C., Canada

[73] Assignee: Shane Marie Owen Vernon, B.C., Canada

[21] Appl. No.: 196,798

[22] Filed: Feb. 15, 1994

Related U.S. Application Data

[63] Continuation of Ser. No. 974,928, Nov. 12, 1992, which is a continuation-in-part of Ser. No. 866,985, Apr. 10, 1992, abandoned.

[51] Int. Cl.$^5$ ............................................. B01D 35/06
[52] U.S. Cl. ..................... 210/223; 184/6.25; 335/303
[58] Field of Search ............... 210/222, 223; 184/6.25; 335/302, 303, 306

[56] References Cited

U.S. PATENT DOCUMENTS

| | | | |
|---|---|---|---|
| 2,014,800 | 9/1935 | Deguenther | 210/165 |
| 2,597,601 | 5/1952 | Sherman | 335/303 |
| 2,838,179 | 6/1958 | Thomas | 210/223 |
| 2,860,787 | 11/1958 | Pieper et al. | 210/223 |
| 2,980,257 | 4/1961 | Paton | 210/223 |
| 3,371,790 | 3/1968 | Kudlaty et al. | 210/223 |
| 3,460,679 | 8/1969 | Llewellyn | 210/222 |
| 3,462,720 | 8/1969 | Miyata | 335/305 |
| 3,480,145 | 11/1969 | Gladden | 210/223 |
| 3,546,643 | 12/1970 | Virostek | 335/303 |
| 3,665,355 | 5/1972 | Sasaki et al. | 335/306 |
| 3,727,658 | 4/1973 | Eldridge, Jr. | 335/303 |
| 3,727,761 | 4/1973 | Aspinwall et al. | 210/130 |
| 3,840,045 | 10/1974 | Grosseau | 137/495 |
| 3,929,519 | 12/1975 | Benz | 335/306 |
| 4,052,312 | 10/1977 | King | 210/223 |
| 4,218,320 | 8/1980 | Liaw | 210/223 |
| 4,450,075 | 5/1984 | Krow | 210/223 |
| 4,498,987 | 2/1985 | Inaba | 210/223 |
| 4,585,553 | 4/1986 | Hikosaka et al. | 210/223 |
| 4,629,558 | 12/1986 | Garritty | 210/130 |
| 4,705,626 | 11/1987 | Morelli | 210/130 |
| 4,826,059 | 5/1989 | Bosch et al. | 224/183 |
| 4,826,592 | 5/1989 | Taylor | 210/223 |
| 4,894,153 | 1/1990 | Shirdavani | 210/222 |
| 5,078,871 | 1/1992 | McCready | 210/222 |
| 5,089,129 | 2/1992 | Brigman | 210/223 |
| 5,273,648 | 12/1993 | Caiozza | 210/223 |

FOREIGN PATENT DOCUMENTS

| | | | |
|---|---|---|---|
| 11365 | 3/1980 | Japan | 210/222 |

Primary Examiner—Matthew O. Savage
Attorney, Agent, or Firm—Jones, Tullar & Cooper

[57] ABSTRACT

A plurality of permanent magnets contained within a flexible non-magnetic strap assembly which is wrapped about the exterior casing of an oil filter or a conduit for other fluids or particulate substances. The magnetic force fields created by the magnets penetrate the interior of the casing or conduit to attract and capture magnetizable particles entrained within the fluid or other substance and retain them against the interior peripheral wall of the casing or conduit. The flexible magnetic strap assembly may be spirally wound about the container for an oil filter, or the conduit for other fluids or particulate substances any number of times to thus maximize the magnetic effect and to fit different size containers or conduits. The flexible magnetic strap assembly may be elastic, with adjustable or non-adjustable joining devices at the ends, or the ends may be permanently joined, to enable fitting the elongated flexible and elastic magnetic strap to different size containers and conduits. The magnetic filter strap assembly may be used on spin-on type or cartridge type oil filter containers in automotive and industrial applications, and may be used about conduits transporting other fluids and particulate substances.

9 Claims, 4 Drawing Sheets

MAGNETIC FILTER STRAP

This application is a continuation of application Ser. No. 07/974,928, filed Nov. 12, 1992, which is a continuation-in-part of Ser. No. 07/866,985 filed on Apr. 10, 1992 now abandoned.

BACKGROUND OF THE INVENTION

1. Field of the Invention

This invention relates to the extraction of magnetizable metallic particles from liquids such as engine oil and other lubricating liquids, including fluids of various types and particulate matter flowing in a stream, e.g., such as grain and grain flakes, and particularly to a magnetic filter strap embodying multiple permanent magnets one pole of each of which is adapted to lie contiguously, or substantially so, against the exterior wall surface of a container through which the engine oil or other liquid, fluid, or particulate matter, flows through the magnetic field of the permanent magnets, or is otherwise contained.

2. Description of the Prior Art

The following Unites States patents and the patents cited therein are known to exist:

| | | |
|---|---|---|
| 2,014,800 | 2,838,179 | 2,860,787 |
| 2,980,257 | 3,460,679 | 3,840,045 |
| 4,052,312 | 4,218,320 | 4,450,075 |
| 4,629,558 | 4,705,626 | 4,826,059 |
| 4,894,153 | | 5,078,871 |

Also known to exist are British patent 557,214 and German patent 478,770.

In general, these prior art patents disclose the broad concept of utilizing magnets in various specific structures and applications for "capturing" magnetizable metal particles too small to be "captured" by conventional filter elements.

While numerous prior art patents have been issued embodying the concept noted in the preceding paragraph, none of the structures disclosed in these patents appear to be commercially successful. It is believed that one reason for the lack of success is the cost of manufacture of the conventional devices resulting from their particular mechanical design.

Accordingly, one of the important objects of the present invention is the provision of a magnetic filter strap that is inexpensive to manufacture and long-lasting in use.

Another disadvantage with some of the prior art devices is their inability to readily accommodate cannisters or containers of varying sizes. It is therefore another object of the present invention to provide a magnetic filter strap that is universally applicable to most oil filter cannisters or filter housings or conduits, including large diesel engine filters and smaller automotive lubricating oil filters.

The relative difficulty of applying the magnetic filter structures of the prior art is believed to be another reason for the lack of successful commercial exploitation of many of the prior art devices. U.S. Pat. No. 4,894,153 for a magnetic attachment for a filter exemplifies such difficulty in that the connecting links engaging the top rim would interfere with the sealing ring at the top of the filter on many models of "spin-on" filters, rendering the device inapplicable to many models of filters, particularly on replaceable cartridge type oil filters that do not possess a top rim bead to clip to.

Accordingly, a still further object of the present invention is the provision of a magnetic filter strap for universal application to all types of filter cannisters or housings or conduits through which pass liquids, fluids or particulate materials such as grains and grain flakes of various kinds and in which may be entrained magnetizable metallic particles.

It is noted that many of the prior art devices utilize magnetizable metallic clamps or clips for attachment of the filter devices. The use of such magnetizable material as a support for the permanent magnets tends to weaken the effectiveness of the magnetic fields produced by the magnets for the reason that such materials tend to "short circuit" or concentrate the magnetic field in a location outside the cannister or filter housing, thus reducing its effectiveness within the housing or cannister, and reducing the ability to attract magnetizable metallic particles suspended in the liquid within the filter housing, or magnetizable metallic particles flowing in a stream of air or a stream of particulate material.

Accordingly, yet another object of the invention is the provision of a magnetic filter strap that maximizes the strength of the magnetic field within the oil or liquid filter housing or conduit so as to impose on the magnetizable metal particles suspended in the liquid, or passing through the conduit, a maximum attraction force so as to extract the magnetizable metal particles from the flowing body of liquid, fluid or particulate material, and collect and retain them in a localized position on the interior surface of the conduit or housing wall until they are removed therefrom during cleaning of the conduit or housing.

It is also noted that some of the prior art devices are themselves immersed within the body of flowing liquid, with the expectation that the metallic particles suspended in the liquid flowing around the magnets will adhere to the magnets and thus be extracted from the body of flowing liquid. The disadvantage of this arrangement is that space between the cannister or housing and the filter element contained therein is limited, and the intrusion of the magnetic device within the cannister or housing causes an obstruction that prevents the free flow of the liquid. Accordingly, a still further object of the invention is the provision of a magnetic strap that may be detachably applied to the exterior of a cannister or housing or conduit through which flows a body of fluid or particulate material that may contain magnetizable metallic particles suspended therein, all without obstructing the passage of the fluid, or liquid, or particulate material past the magnetic strap.

Yet another object of the invention is the provision of a flexible magnetic strap adapted to be fabricated of indeterminate length and having attachment means at opposite ends of the strap to enable engagement of the end portions of the strap to each other or to adjacent associated portions of the strap to effectively retain the magnetic strap wrapped about an elongated detachable conduit section or insert sealingly disposed between the associated ends of a longer conduit of indeterminate length.

Because the magnetic strap of the invention will sometimes be utilized in environments in which there is present a great deal of vibration, it is an advantage to form the strap in a manner that it may be tightly wound about a supporting cannister, housing or conduit with the magnets contiguous to the outer surface of these supporting members. Accordingly, another object of the invention is the provision of a magnetic strap that is constructed of elongated elastic material with the magnets embedded in the elastic material so that adjacent magnets present poles of opposite polarity, and which incorporates attachment means at opposite ends to retain the flexible and elastic magnetic strap in elastically stretched condition on the supporting structure.

A still further object of the invention is the provision of a supporting strap and multiple magnet assembly that is light in weight, inexpensive to fabricate, and extremely flexible to enable the strap to be wrapped about or supported on or by cylindrical or non-cylindrical supporting cannisters, housings or conduits through which flow liquids, fluids, or other particulate materials believed to contain suspended or entrained magnetizable metallic particles.

The invention possesses other objects and features of advantage, some of which, with the foregoing, will be apparent from the following description and the drawings. It is to be understood however that the invention is not limited to the embodiments illustrated and described since it may be embodied in various forms within the scope of the appended claims.

SUMMARY OF THE INVENTION

In terms of broad inclusion, the magnetic strap of the invention comprises an elongated assembly including in one aspect an elongated flexible body member having recesses or nacelles spaced therealong, and in another aspect constituting a sheath fabricated from moisture and oil impervious material, such as that sold under the trademark NYLON, and having positioned within the recesses or nacelles, or along the sheath, a plurality of spaced permanent magnets arranged to alternately present faces of opposite polarity. Between adjacent permanent magnets there is provided a flexible length of closed-cell synthetic resinous material, such as neoprene, which cooperates with the flexible sheath to retain the permanent magnets spaced along the length of the assembly. At opposite ends, the assembly includes means for attaching the ends to one another, or to the associated end portion of the elongated body or sheath to thereby retain the elongated assembly wrapped about a supporting structure with the magnets disposed contiguously to or closely about the outer surface of the supporting structure.

DESCRIPTION OF THE PREFERRED EMBODIMENT

Figure 1:
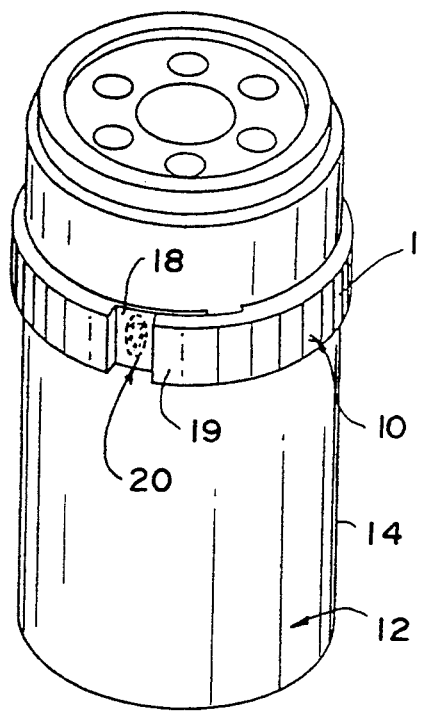
FIG. 1 is a perspective view of one embodiment of the magnetic strap of the invention wrapped about the exterior surface of a conventional automotive oil filter container.

In terms of greater detail, and referring to the drawings, the numeral 10 generally designates one embodiment of the magnetic strap assembly embodying the present invention.

Figure 2:
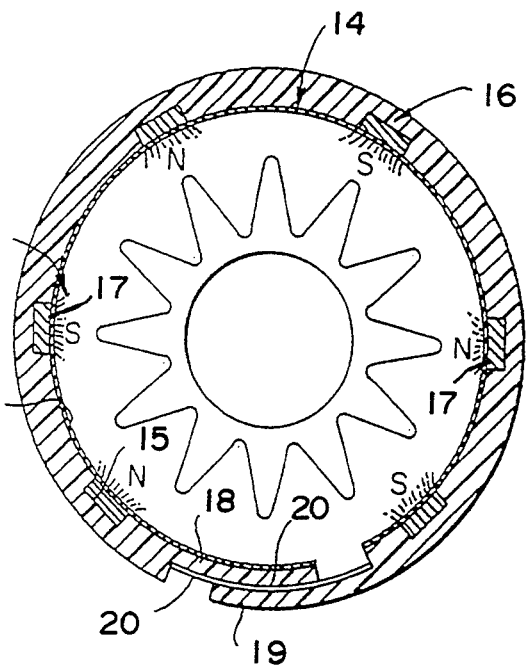
FIG. 2 is a horizontal cross-sectional view taken transverse to the longitudinal axis of the filter container and medianly of the magnetic strap of the assembly illustrated in FIG. 1.

In the embodiment of FIG. 1, the magnetic strap assembly 10 includes a flexible strap 11, fabricated from an appropriate synthetic resinous material such as neoprene, which is elastomeric and therefore also elastic, and adapted to be wrapped snugly about an automotive type oil filter unit 12 having an exterior casing 14. The magnetic strap assembly 10 includes a plurality of permanent magnets 16 securely embedded along the length of the strap in spaced relation, as shown in FIG. 2, the magnets extending transversely across the strap, and being either press-fitted into appropriate recesses 15 formed in the neoprene strap to receive them, or adhesively secured within the recesses 15 so that the exposed faces 17 of the magnets constitute, alternately, the north and south seeking magnetic poles of the permanent magnets, as indicated by the letters "N" or "S" associated with the exposed face of each of the magnets. It will of course be understood that the opposite faces of the magnets are of opposite polarity.

The magnetic strap assembly is snugly and detachably secured about the exterior surface 14 of the oil filter container 12 so that the exposed faces of the magnets lie contiguously against the outer surface 14 of the filter container, resulting in the magnetic force field pattern of each magnet penetrating the wall of the container and extending into the oil or other material within the container. To facilitate attachment of the strap to the container, the opposite end portions 18 and 19 of the neoprene strap are reduced in thickness as shown, and the inner surfaces of the reduced-in-thickness strap end portions are provided with detachably interengageable means 20, here shown to be of the hook-and-felt type that, when overlapped as shown, detachably interengage upon pressure being applied to the overlapped end portions, and which detach from one another when tension is applied to the union as when one strap end is peeled away from the other. This method of detachable attachment of the overlapped end portions 18 and 19 enables application of the magnetic strap about containers of different diameters inasmuch as the overlapped end portions may be shifted longitudinally to accommodate containers of different diameters.

Figure 1B:
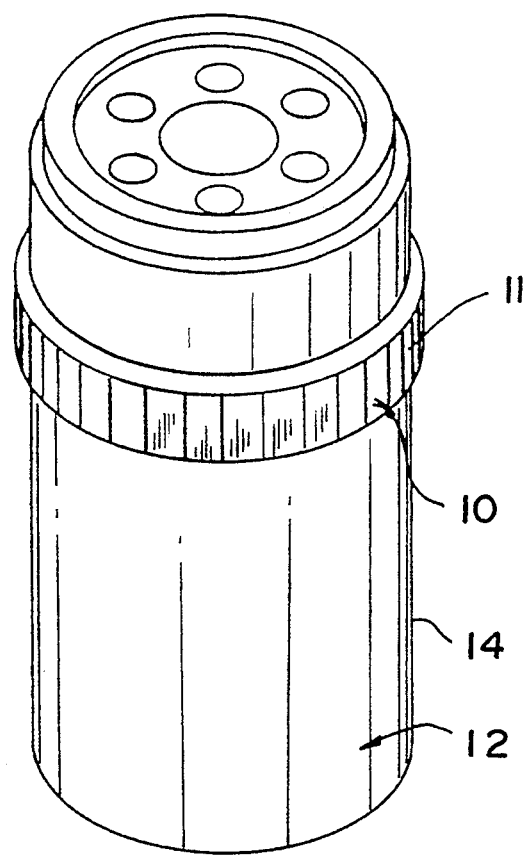
FIG. 1b is a perspective view of another embodiment of the magnetic strap of the invention wrapped about the exterior surface of a conventional automotive oil filter container, this embodiment of the strap having permanently joined ends forming a continuous band.
Figure 5:
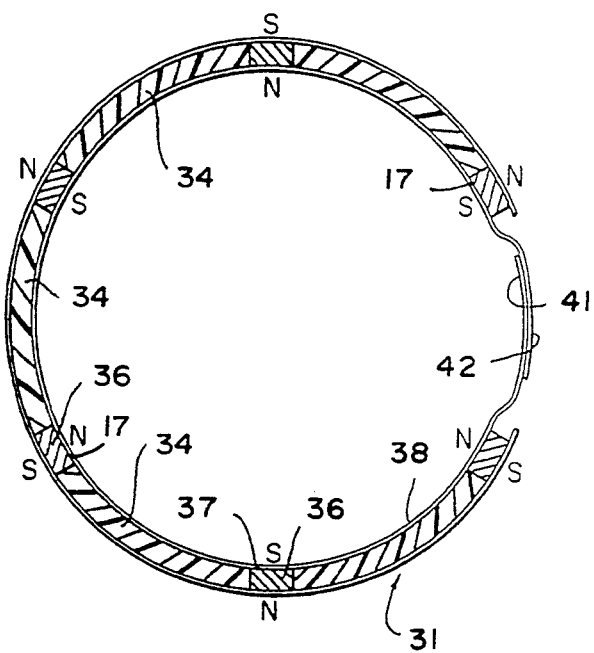
FIG. 5 illustrates the preferred embodiment of the magnetic strap assembly of my invention, shown arranged into a closed circular condition, and illustrating the alternate polarities of the spaced permanent magnets arranged along the length of the strap.
Figure 10:
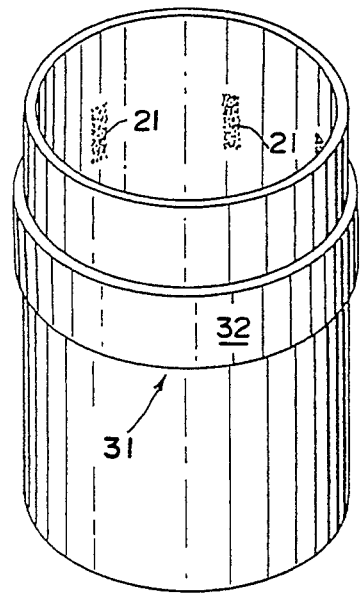
FIG. 10 is a perspective view of the embodiment shown in FIG. 5 wrapped about the exterior surface of a cylindrical container.

Alternatively as illustrated in FIG. 1b, the two ends of the flexible strap 11 can be permanently joined by any conventional means to form a continuous elastic band that is retained in an elastically stretched condition on the oil filter unit 12.

Referring to FIG. 2, it will be seen that the alternate polarity faces of the magnets 16 lie contiguously against the outer surface 14 of the container 12, and that the magnetic field force associated with each magnet penetrates into the interior of the container and into the fluid or particulate material therein, and causes magnetizable particles 22 of metal to be drawn to the inner peripheral surface 21 of the container, where they accumulate over time as the oil or other particulate material flows through the magnetic force field. The magnetizable particles are held to the inner peripheral surface of the container as long as the magnetic strap is maintained snugly attached to the exterior surface. Periodically, as when it is time to change the filter element within the container, the container is removed from its mounting, the filter element is removed from the container, and the magnetic strap is detached and removed from the exterior surface of the container. This has the effect of releasing the magnetizable metallic particles 21 from the inner peripheral surface of the container, which may now be easily and efficiently rinsed or wiped from the inner periphery by any suitable means or method.

Figure 3:
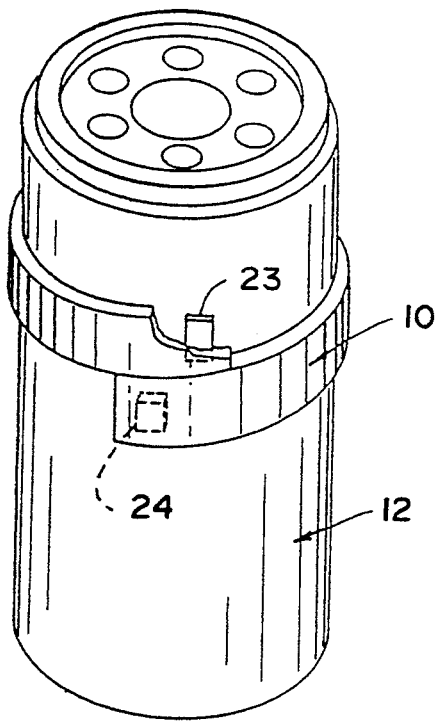
FIG. 3 is a perspective view similar to FIG. 1, but illustrating a slightly different embodiment in which the magnetic strap is spirally wound about the cylindrical exterior surface of the automotive oil filter container with the ends of the strap attached directly to the container.

In the embodiment of the invention illustrated in FIG. 3, the same function is performed by the magnetic strap assembly 10. However, in this embodiment, the magnetic strap is spirally wrapped about the outer periphery 14 of the container 12 instead of being circularly wrapped thereabout as in the embodiment of FIGS. 1 and 2. This embodiment eliminates the need to provide reduced-in-thickness end portions, such as 18 and 19 in FIGS. 1 and 2, and also eliminates the need to provide the detachably interengageable fastener means 20 on the ends of the magnetic strap assembly. Rather, in this embodiment, the magnetic strap is retained snugly yet detachably wrapped spirally about the outer periphery of the container by the magnetic force fields from two magnets 23 and 24 on opposite ends of the strap, embedded as previously described, which attach themselves magnetically to the container. It will be apparent to those skilled in the art that this embodiment is particularly useful with containers that are fabricated from ferromagnetic material, such as steel, and that the length of the magnetic strap assembly may be of indeterminate length so that multiple turns of the magnetic strap assembly may be wrapped spirally about the container instead of a single wrap as shown.

Figure 4:
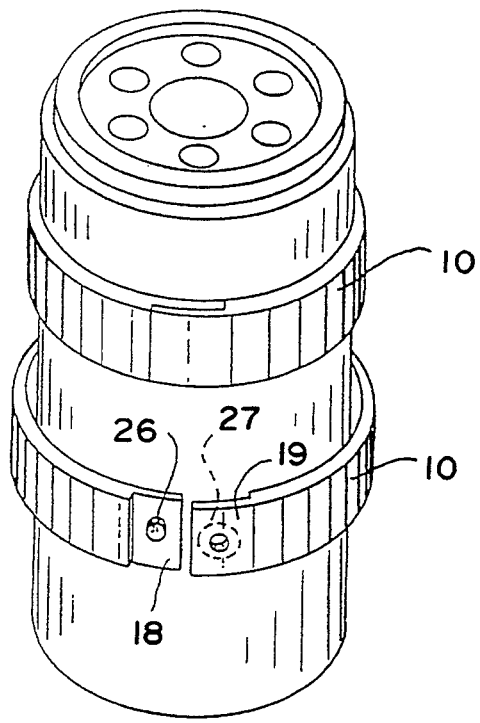
FIG. 4 is a perspective view of a third embodiment of the invention, illustrating two magnetic straps according to my invention wrapped about the exterior surface of a conventional automotive type oil filter container, and employing quick-release cooperative fastener devices on opposite ends of the magnetic straps to secure the magnetic straps to the container.

The embodiment of the invention illustrated in FIG. 4 is similar in construction to the embodiment of the magnetic strap illustrated in FIG. 1, but differs in the type of detachable interengagement means provided to detachably secure the opposite ends of the magnetic strap assembly. In this embodiment, selectively engageable and disengageable complementary snap-fastener elements 26 and 27 are provided on opposite ends of the reduced-in-thickness end portions 18 and 19. While I have indicated only one pair of cooperatively related snap-fastener elements, it will of course be apparent that multiple snap fastener elements of one kind or the other may be provided on one end of the magnetic strap assembly to provide a range of adjustment to accommodate containers of different diameters. Additionally, since this embodiment contemplates only a single turn of the magnetic strap assembly about the container, it is apparent that a plurality or multiple magnetic strap assemblies may be applied as illustrated.

The embodiment of the invention illustrated in FIGS. 5 through 9, and 10, inclusive, contemplates a magnetic strap assembly designated generally by the numeral 31 which performs the same function discussed above with respect to the embodiments illustrated in FIGS. 1 through 4, inclusive. However, the structure of the magnetic strap assembly 31 differs in that instead of an elongated flexible body of neoprene within which are formed nacelles or recesses 15 in which the permanent magnets are embedded, the strap of this embodiment is formed from a strip of very thin sheet material 32, preferably of synthetic resinous material, of indeterminate length. Preferably, one surface 33 of the thin sheet of elongated material is provided with an appropriate adhesive (not shown), and there is disposed longitudinally along the length of the strip material in spaced end-to-end relationship on the adhesive coated surface thereof, a plurality of flexible blocks 34 of closed-cell foam filler material, conveniently of polyurethane or other equivalent synthetic resinous material.

Between the spaced ends of each pair of adjacent flexible blocks there is snugly inserted a permanent magnet 36, one polar face 37 of which is thus adhesively secured to the single thickness or layer 38 of underlying thin flexible sheet of synthetic resinous material. In this embodiment of the invention it is important that the thickness of the sheet portion 38 be very thin so that when the magnetic strap is wound about a container (see FIG. 10), the polar face of the magnet lies very close to the surface of the container so as to not reduce significantly the magnetic force field that passes through the container wall and into the fluid or other material within the container to draw magnetizable particles 21 to the inner surface of the container wall. The magnets are of the same thickness as the associated filler blocks, and each magnet has a length that corresponds to the width of the filler blocks. Alternate magnets have polar faces of the same polarity facing in the same direction, so that adjacent magnets have polar faces of different polarity facing in the same direction. Stated in other words, the permanent magnets are adhesively secured to the underlying strip of sheet material so that adjacent permanent magnets have opposite polarity faces secured to the underlying strip.

Figure 8:
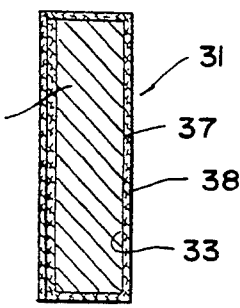
FIG. 8 is a vertical cross-sectional view of the magnetic strap taken in the plane indicated by the line 8—8 in FIG. 6.

Preferably, the elongated assembly of filler blocks and permanent magnets are arranged medially on the adhesive coated surface of the thin sheet material parallel to and equally spaced from the long edges thereof so that the width of the thin sheet on opposite sides of the elongated assembly of filler blocks and permanent magnets equals the width plus the thickness of the assembly. To complete the assembly, first one elongated edge strip portion on one side of the filler blocks and magnets is folded tightly over the edges and ends of the magnets and adhesively adhered to the top exposed surfaces of the filler blocks and magnets. Next, the opposite elongated edge strip portion is folded tightly over the first edge strip portion so that the adhesive surface thereon permanently adheres to the outer exposed surface of the first elongated edge strip portion to thus form an elongated and flexible sheath within which the elongated flexible blocks and magnets are contained. Pressure may be applied to eliminate air bubbles between the two laminated layers of thin sheet material. This completed arrangement is illustrated in FIG. 8. Instead of an elongated thin flexible sheet formed to produce a tubular sheath, it is contemplated that the tubular sheath may also be formed from flexible heat-shrinkable synthetic resinous material within which the flexible blocks and magnets are positioned prior to application of heat so that when heat is applied, the heat-shrinkable synthetic resinous tubular material shrinks down around the flexible blocks and magnets to form the elongated flexible magnetic strap assembly.

Figure 6:
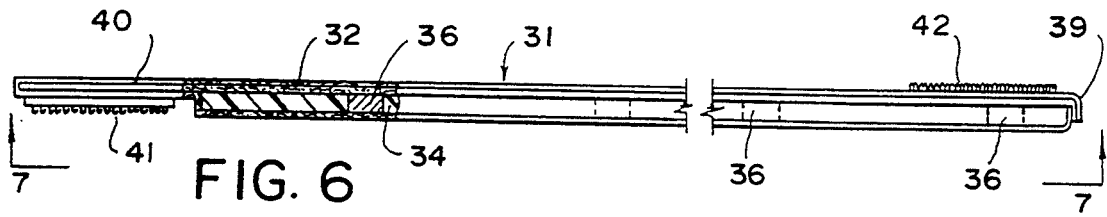
FIG. 6 is an elevational edge view of the magnetic strap assembly of FIG. 5, shown extended, with portions of the strap broken away to reveal underlying structure.
Figure 7:
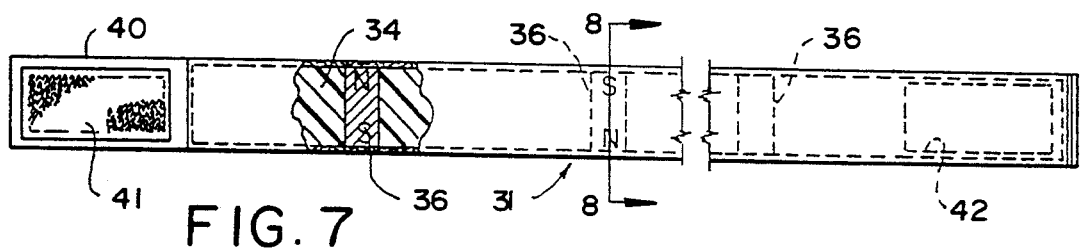
FIG. 7 is an elevational plan view of the magnetic strap assembly taken in the direction of the arrows 7—7 in FIG. 6.

As illustrated in FIG. 6, the ends 39 of the thin sheet material are folded over and adhesively secured to close one end of the sheath thus formed, and at the opposite end the projecting portions 40 of overlapped thin sheet material are pressed together to laminate these end portions and thereby seal this end of the sheath surrounding the flexible filler blocks and magnets. I have found that a convenient thickness for each of the closed cell foam filler blocks is 0.25 inches, with a length of approximately 3.0 inches and a width of approximately 1.0 inches. The magnets are of the same thickness and have a length equal to the width of the filler blocks, and a width of approximately 0.25 inches. Thus, the magnets are spaced along the length of the strap approximately three inches apart for the full length of the strap. Since the closed cell foam filler blocks are flexible, the magnetic strap assembly is flexible over its entire length, thus enabling it to be wound continuously about large or small containers of whatever configuration.

In the embodiment of the invention illustrated in FIGS. 5 through 8, means designated generally by the numerals 41 and 42 are applied to opposite end portions of the strap for detachably securing one end of the strap to the other, or for attaching each end of the strap to an associated portion of the same end of the strap, or for attaching each end of the magnetic strap assembly to a supporting structure, as will hereinafter be explained. In this embodiment, as in the embodiment of FIGS. 1 and 2, the attachment means 41 and 42 comprise hook-and-felt type fastener elements which may be detachably engaged by overlapping the elements and applying pressure, and which may be disengaged by peeling one end portion element from the other as previously explained.

Figure 9:
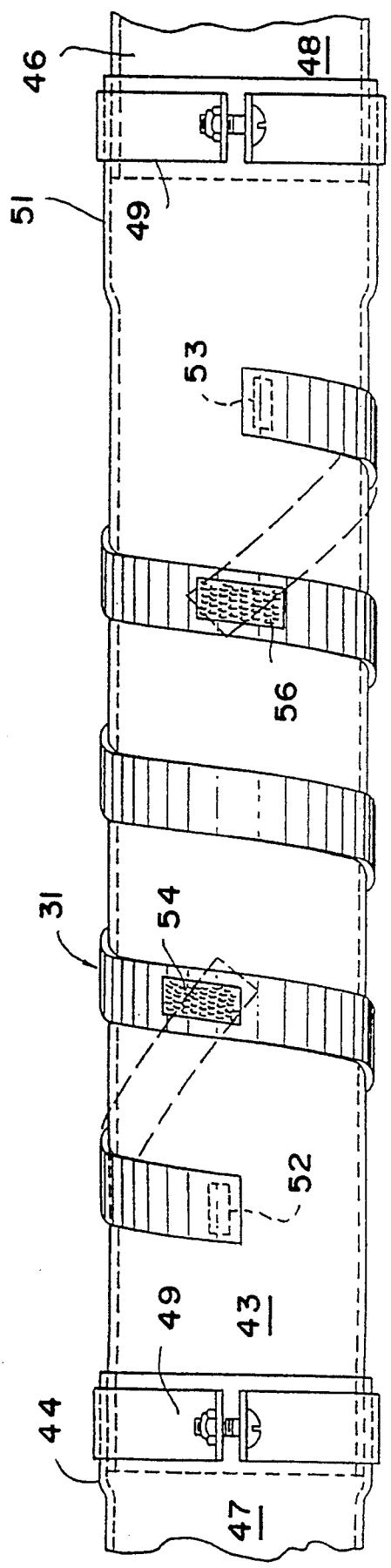
FIG. 9 is an elevational view of a magnetic strap according to my invention wrapped spirally about a detachable insert adapted for sealing insertion between the adjacent and mutually facing ends of a conduit of indeterminate length.

The embodiment of the invention illustrated in FIG. 9 illustrates the versatility of the invention. Here, the elongated magnetic strap assembly 31 of indeterminate length is seen wrapped spirally about an elongated tubular member 43, here shown to be cylindrical, but other configurations are feasible. The elongated tubular member constitutes, as shown, a detachable insert fitted between the end portions 44 and 46 of elongated conduits 47 and 48, respectively. The detachable insert is secured in place by appropriate clamp elements so that the detachable insert 43 effectively constitutes a detachable continuity of the conduit 47–48 through which either fluid or other materials bearing magnetizable metal particles may flow. While I have shown the detachable insert 43 to possess one belled end portion 51 for ease of application, it will be apparent that many different types and styles of interconnection may be utilized without departing from the spirit of the invention.

To retain the spirally wound magnetic strap assembly 31 on the tubular insert 43, it will be seen that where the tubular insert is fabricated from a ferrous material, such as sheet steel, single permanent magnets 52 and 53 secured to opposite end portions of the magnetic strap assembly will function to magnetically retain the associated ends attached to the surface of the ferrous insert member 43. Where the detachable insert 43 is fabricated from a non-magnetic material, such as brass or aluminum, the end portions of the magnetic strap assembly may be provided with hook and felt type fastener elements 54 and 56 of the type previously discussed so that the end portions of the elongated indeterminate length magnetic strap assembly may be wrapped back upon itself as shown so as to interengage the hook and felt type fastener elements to thus securely anchor the end portions of the magnetic strap assembly.

Having thus described the invention, what is believed to be new and novel and sought to be protected by letters patent of the United States is as follows.

I claim:
1. A fluid filter unit comprising:
a housing including a cylindrical imperforate wall defining an outer peripheral surface and an inner peripheral surface, said housing including a fluid inlet and a fluid outlet;
filter means disposed in said housing between said inlet and said outlet for filtering fluid;
an annular flexible band formed entirely from a non-magnetic synthetic resinous material which is sized to be secured around the outer peripheral surface of said wall;
a plurality of permanent bar magnets secured to said flexible band at spaced intervals along a circumference of the band for attracting metal particles to the inner peripheral surface of said wall in which the band is secured, each said magnet including opposing inner and outer polar faces, wherein the inner polar face of each said magnet abuts the outer peripheral surface of said wall; and,
a plurality of circumferentially spaced recesses formed in said band and extending transversely relative to said circumference, wherein said permanent bar magnets are secured within said circumferentially spaced recesses with the inner polar faces of said magnets being contiguous with the outer peripheral surface of said wall.

2. A fluid filter unit comprising:
a housing including a cylindrical imperforate wall defining an outer peripheral surface and an inner peripheral surface, said housing including a fluid inlet and a fluid outlet;
filter means disposed in said housing between said inlet and said outlet for filtering fluid;
an annular flexible band formed from a non-magnetic synthetic resinous material which is sized to be secured around the outer peripheral surface of said wall; and
a plurality of permanent bar magnets secured to said flexible band at spaced intervals along a circumference of the band for attracting metal particles to the inner peripheral surface of said wall on which the band is secured;

wherein, said band further comprises a flexible tubular sheath structure containing said permanent magnets and a plurality of flexible filler blocks disposed, one each, between adjacent pairs of said magnets.

3. A magnetic strap assembly for detachable application about the exterior of a fluid filter unit comprising:

a) a fluid filter unit having a housing and a filter means, said housing including a cylindrical imperforate wall defining an outer peripheral surface and an inner peripheral surface, said housing further including a fluid inlet and a fluid outlet, wherein said filter means is disposed in said housing between said inlet and said outlet for filtering fluid;

b) an annular elastic, flexible band formed from non-magnetic elastomeric material which is sized to be secured around the outer peripheral surface of said wall in an elastically stretched condition, said band comprising an elongated elastic, flexible strap having a first end and a second end, and means to attach said first and second ends to form said band; and, c) a plurality of permanent bar magnets secured to said elastic, flexible band at spaced intervals along a circumference of the band for attracting metal particles to said inner peripheral surface of said wall on which the band is secured.

4. The magnetic strap assembly of claim 3, wherein a plurality of circumferentially rectangular recesses extending transversely relative to said circumference are formed in said band and said permanent bar magnets are secured within said circumferentially spaced recesses.

5. The magnetic strap assembly of claim 3, wherein said means to attach comprises a hook fastener element disposed at said first end of said strap and a cooperating felt type fastener element disposed at said second end of said strap.

6. The magnetic strap assembly of claim 3 wherein said means to attach comprises a first snap-fastener element disposed at said first end of said strap and a second, complimentary snap-fastener element disposed at said second end of said strap.

7. The magnetic strap assembly of claim 3, wherein said band is formed from synthetic resinous material.

8. The magnetic strap assembly of claim 3, wherein the magnetic polarity of the magnetic polar face of each magnet spaced along the band is of a polarity opposite to the polarity of the adjacent magnets.

9. The magnetic strap assembly of claim 3, wherein said first and second ends of said strap are permanently attached.

* * * * *